(12) United States Patent
Diemer

(10) Patent No.: US 7,995,147 B2
(45) Date of Patent: Aug. 9, 2011

(54) APPARATUS AND METHOD FOR COMPENSATING FOR VARYING ADJACENT CHANNEL CONDITIONS

(75) Inventor: Rodger Anthony Diemer, Indianapolis, IN (US)

(73) Assignee: Thomson Licensing, Boulogne-Billcourt (FR)

( * ) Notice: Subject to any disclaimer, the term of this patent is extended or adjusted under 35 U.S.C. 154(b) by 1244 days.

(21) Appl. No.: 11/596,497

(22) PCT Filed: May 5, 2005

(86) PCT No.: PCT/US2005/015842
§ 371 (c)(1),
(2), (4) Date: Nov. 13, 2006

(87) PCT Pub. No.: WO2005/117415
PCT Pub. Date: Dec. 8, 2005

(65) Prior Publication Data
US 2008/0043149 A1    Feb. 21, 2008

Related U.S. Application Data

(60) Provisional application No. 60/572,171, filed on May 18, 2004.

(51) Int. Cl.
*H04N 5/00* (2011.01)
(52) U.S. Cl. .......................... 348/607; 348/725; 348/726
(58) Field of Classification Search .......... 348/725–726, 348/731–733, 426, 607, 553–555; 375/321, 375/350, 232, 326, 346, 365; *H04N 5/21, H04N 5/213, 5/217*
See application file for complete search history.

(56) References Cited

U.S. PATENT DOCUMENTS

| | | | | |
|---|---|---|---|---|
| 5,309,482 A | * | 5/1994 | Wright et al. | 375/350 |
| 5,648,822 A | | 7/1997 | Hulyalkar | |
| 5,661,528 A | * | 8/1997 | Han | 348/607 |
| 5,745,187 A | | 4/1998 | Hulyalkar et al. | |
| 5,818,544 A | * | 10/1998 | Han | 348/725 |
| 6,272,318 B1 | | 8/2001 | Yoshioka | |
| 6,426,780 B1 | | 7/2002 | Limerg et al. | |

(Continued)

FOREIGN PATENT DOCUMENTS

GB     2 166 612 A     5/1986

(Continued)

OTHER PUBLICATIONS

Sage, Gerald. "Understanding Asynchronous Multi-Rate Filters," http://www.commsdesign.com/showArticle.jhtml?articleID=16503985. Dec. 5, 2001, XP002342773.

(Continued)

*Primary Examiner* — Trang U Tran
(74) *Attorney, Agent, or Firm* — Robert D. Shedd; Joseph J. Opalach; Brian J. Cromarty

(57) ABSTRACT

An apparatus such as a television signal receiver is capable of removing adjacent channel energy for extremely different desired channel bandwidths and varying adjacent channel conditions. According to an exemplary embodiment, the apparatus includes a digital signal source for providing a digital signal having a symbol rate, and a plurality of symbol shaping filters. A selected one of the symbol shaping filters is used to filter the digital signal and generate a filtered digital signal based on the symbol rate.

15 Claims, 6 Drawing Sheets

U.S. PATENT DOCUMENTS

| | | | |
|---|---|---|---|
| 6,441,843 B1 | 8/2002 | Limberg | |
| 7,038,730 B2 * | 5/2006 | Markman et al. | 348/607 |
| 7,548,281 B2 * | 6/2009 | Kim et al. | 348/726 |

FOREIGN PATENT DOCUMENTS

| | | |
|---|---|---|
| JP | 10341462 | 12/1998 |
| JP | 11032094 | 2/1999 |
| JP | 2004072644 | 3/2004 |

OTHER PUBLICATIONS

General Sage: "Understanding Asynchronous Multi-Rate Filters" COOMS Design, Online! Dec. 5, 2001, XP002342773 Retrieved from the Internet: URL:http://www.commsdesign.com/design-corner/showArticle.jhtml?article ID=16503985> retrieved on Aug. 30, 2005! The whole document.

* cited by examiner

APPARATUS AND METHOD FOR COMPENSATING FOR VARYING ADJACENT CHANNEL CONDITIONS

CROSS REFERENCE TO RELATED APPLICATION

This application claims the benefit, under 35 U.S.C. §365 of International Application PCT/US2005/015842, filed May 5, 2005, which was published in accordance with PCT Article 21(2) on Dec. 8, 2005, in English, which claims the benefit of United States Provisional Patent Application No. 60/572,171, filed May 18, 2004.

BACKGROUND OF THE INVENTION

1. Field of the Invention

The present invention generally relates to signal processing for apparatuses such as television signal receivers, and more particularly, to an apparatus and method for performing signal processing that is capable of removing adjacent channel energy for extremely different desired channel bandwidths and varying adjacent channel conditions.

2. Background Information

With apparatuses such as television signal receivers, the proper reception of a desired channel may be adversely affected by the presence of undesired adjacent channels. One example of this adjacent channel problem may be observed with the so-called "Open Cable" standard. In particular, the Open Cable standard refers to the Society of Cable Telecommunications Engineers (SCTE) 28 standard which combines certain physical layer aspects of the SCTE 55-1 and SCTE 55-2 standards. The aforementioned standards are generally known to those skilled in the art.

One problem with combining the SCTE 55-1 and SCTE 55-2 standards relates to bandwidth differences in the physical layer of an out-of-band channel (also known as a forward data channel). In particular, there is a 2:1 difference in bandwidth between the high and low bandwidth signals used in these two standards. This bandwidth difference is largely attributable to the fact that the SCTE 55-1 and SCTE 55-2 standards use three extremely different symbol rates, namely: 0.772 MSym/S, 1.024 MSym/S, and 1.544 MSym/S. Each one of these symbol rates uses a different bandwidth, and thereby produces a different adjacent channel condition during signal processing.

Conventionally, a surface acoustic wave (SAW) filter or other high order filter is used before analog-to-digital conversion to remove adjacent channel energy. However, if the adjacent channel energy is not sufficiently removed, poor decisions in symbol timing and carrier recovery as well as equalization may result, thereby causing demodulation errors.

Heretofore, the aforementioned problem of removing undesired adjacent channel energy has not been adequately addressed. Accordingly, there is a need for an apparatus and method capable of removing adjacent channel energy for extremely different desired channel bandwidths and varying adjacent channel conditions. The present invention addresses these and/or other issues.

SUMMARY OF THE INVENTION

In accordance with an aspect of the present invention, an apparatus capable of compensating for varying adjacent channel conditions is disclosed. According to an exemplary embodiment, the apparatus comprises a digital signal source for providing a digital signal having a symbol rate, and a plurality of symbol shaping means. A selected one of said symbol shaping means is used to filter the digital signal and generate a filtered digital signal based on the symbol rate.

In accordance with another aspect of the present invention, a method for performing signal processing is disclosed. According to an exemplary embodiment, the method comprises steps of receiving a digital signal having a symbol rate, providing a plurality of symbol shaping filters, and using a selected one of the symbol shaping filters to filter the digital signal and generate a filtered digital signal based on the symbol rate.

In accordance with yet another aspect of the present invention, a television signal receiver is disclosed. According to an exemplary embodiment, the television signal receiver comprises a digital signal source for providing a digital signal having a symbol rate, and a plurality of symbol shaping filters. A selected one of the symbol shaping filters is used to filter the digital signal and generate a filtered digital signal based on the symbol rate.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

DESCRIPTION OF THE PREFERRED EMBODIMENTS

Figure 1:
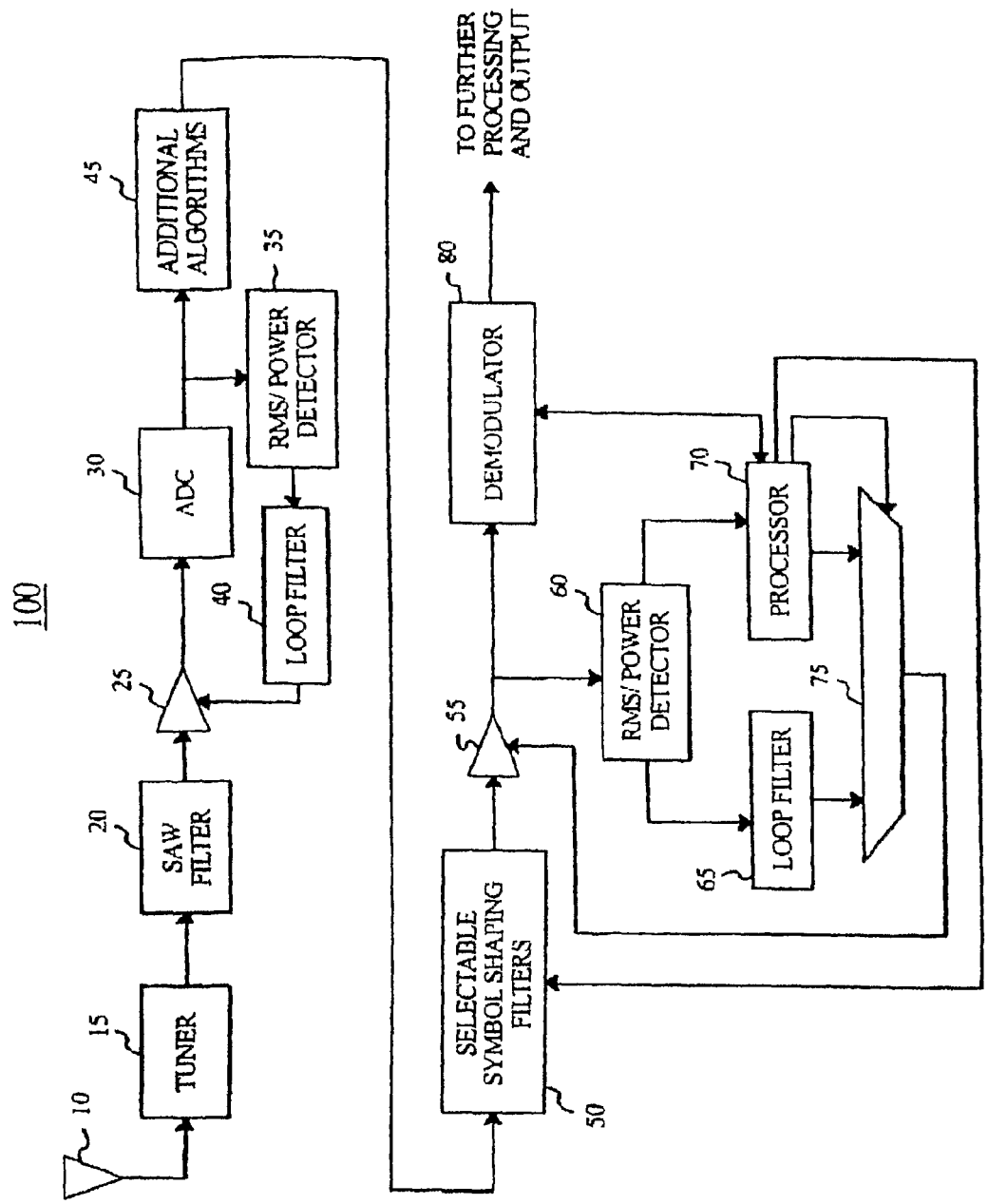
FIG. 1 is a block diagram of an apparatus according to an exemplary embodiment of the present invention.

Referring now to the drawings, and more particularly to FIG. 1, a block diagram of an apparatus 100 according to an exemplary embodiment of the present invention is shown. As shown in FIG. 1, apparatus 100 comprises signal receiving means such as signal receiving element 10, tuning means such as tuner 15, filtering means such as SAW filter 20, first amplifying means such as amplifier 25, analog-to-digital converting means such as analog-to-digital converter (ADC) 30, first power detecting means such as root mean squared (RMS)/power detector 35, first loop filtering means such as loop filter 40, first algorithm means such as additional algorithms block 45, selectable symbol shaping filtering means such as selectable symbol shaping filters block 50, second amplifying means such as amplifier 55, second power detecting means such as RMS/power detector 60, second loop filtering means such as loop filter 65, processing means such as processor 70, multiplexing means such as multiplexer 75, and second algorithm means such as additional algorithms block 80. Many of the foregoing elements of FIG. 1 may be embodied using integrated circuits (ICs), and some elements may for example be included on one or more ICs. For clarity of description, certain conventional elements associated with apparatus 100 such as certain control signals, power signals, clock signals and/or other elements may not be shown in FIG. 1. According to an exemplary embodiment, apparatus 100 is embodied as a television signal receiver, but may be embodied as another type of apparatus or device.

Signal receiving element 10 is operative to receive an RF signal from one or more signal sources such as cable, terrestrial, satellite, internet and/or other signal sources. According to an exemplary embodiment, signal receiving element 10 is embodied as an antenna, but may also be embodied as any type of signal receiving element such as an input terminal and/or other element.

Tuner 15 is operative to perform a signal tuning function. According to an exemplary embodiment, tuner 15 receives the RF signal from signal receiving element 10, and performs the signal tuning function by filtering and frequency downconverting (i.e., single or multiple stage downconversion) the RF signal to thereby generate an IF signal. The RF signal and IF signal may include audio, video and/or data content, and may be of an analog modulation scheme (e.g., NTSC, PAL, SECAM, etc.) and/or a digital modulation scheme (e.g., ATSC, QAM, etc.).

SAW filter 20 is operative to filter the IF signal provided from tuner 15 to thereby generate a filtered IF signal. According to an exemplary embodiment, SAW filter 20 includes one or more individual SAW filters which remove a substantial portion of the undesired, adjacent channel energy from the IF signal provided from tuner 15 to generate the filtered IF signal.

Amplifier 25 is operative to amplify the filtered IF signal provided from SAW filter 20 to thereby generate an amplified IF signal. According to an exemplary embodiment, amplifier 25 also receives an analog AGC signal from loop filter 40 which enables an analog AGC function.

ADC 30 is operative to perform an analog-to-digital conversion function. According to an exemplary embodiment, ADC 30 converts the amplified IF signal provided from amplifier 25 from an analog format to a digital format to thereby generate a digital IF signal. According to this exemplary embodiment, the digital IF signal generated by ADC 30 is a 10-bit digital signal, although the number of bits used may be selected as a matter of design choice.

RMS/power detector 35 is operative to detect the RMS power level of the digital IF signal output from ADC 30 and provide an output signal representing an error estimate of the power level of the digital IF signal. Loop filter 40 is operative to filter the output signal provided from RMS/power detector 35 to thereby generate the analog AGC signal that is provided to amplifier 25 to enable the analog AGC function.

Additional algorithms block 45 is operative to perform functions including a frequency downconversion function. According to an exemplary embodiment, additional algorithms block 45 frequency downconverts the digital IF signal provided from ADC 30 from an IF frequency to a near baseband frequency.

Selectable symbol shaping filters block 50 is operative to filter the digital signal provided from additional algorithms block 45 to thereby generate a filtered digital signal. According to an exemplary embodiment, selectable symbol shaping filters block 50 comprises a plurality of individual symbol shaping filters that each corresponds to a particular symbol rate. According to this exemplary embodiment, symbol shaping filters block 50 includes three individual symbol shaping filters designed to accommodate symbol rates of approximately 0.772 MSym/S, 1.024 MSym/S, and 1.544 MSym/S, respectively. However, the actual number of symbol shaping filters included in symbol shaping filters block 50 may be a matter of design choice. As previously indicated herein, each of the aforementioned symbol rates uses a different bandwidth, and thereby produces a different adjacent channel condition during signal processing. Accordingly, by accommodating different symbol rates, selectable symbol shaping filters block 50 is able to compensate for various different adjacent channel conditions. Further details regarding selectable symbol shaping filters block 50 will be provided later herein with reference to FIG. 2.

Amplifier 55 is operative to amplify the filtered digital signal provided from selectable symbol shaping filters block 50 to thereby generate an amplified digital signal. According to an exemplary embodiment, amplifier 55 also receives a digital AGC signal from multiplexer 75 which enables a digital AGC function.

RMS/power detector 60 is operative to detect the RMS power level of the amplified digital signal output from amplifier 55 and provide an output signal representing an error estimate of the power level of the amplified digital signal. Loop filter 65 is operative to filter the output signal provided from RMS/power detector 60 to thereby generate a digital AGC signal that is provided to multiplexer 75.

Processor 70 is operative to perform various signal processing functions. According to an exemplary embodiment, processor 70 receives the output signal from RMS/power detector 60 representing the error estimate of the power level of the amplified digital signal provided from amplifier 55, and generates another digital AGC signal that is provided to multiplexer 75. Processor 70 also generates a control signal that causes multiplexer 75 to output either the digital AGC signal generated by loop filter 65, or the digital AGC signal generated by processor 70. According to this exemplary embodiment, the digital AGC signal generated by loop filter 65 is generally used as default, unless it produces processing errors that are detected by processor 70. In the case of such errors, the digital AGC signal generated by processor 70 may be used instead.

Also according to an exemplary embodiment, processor 70 is operative to control the operations of selectable symbol shaping filter block 50 and demodulator 80. According to this exemplary embodiment, processor 70 provides a control signal to demodulator 80 responsive to apparatus 100 being turned on by a user. This control signal causes a symbol timing loop of demodulator 80 to be set up for a particular symbol rate. Processor 70 then also provides a control signal to selectable symbol shaping filters block 50 to thereby select one of its individual symbol shaping filters that corresponds to the particular symbol rate. After the symbol timing loop of demodulator 80 is set up for the particular symbol rate and the corresponding symbol shaping filter is selected, demodulator 80 should be able to obtain demodulation lock on a received signal within a predetermined time period if the received signal uses the particular symbol rate. If the received signal does not use the particular symbol rate, demodulator 80 will not be able to obtain demodulation lock. In this latter case, demodulator 80 provides a control signal to processor 70 indicating that demodulation lock is not obtained. In response to this control signal from demodulator 80, processor 70 then provides control signals to demodulator 80 and selectable symbol shaping filters block 50 to respectively adjust the symbol timing loop of demodulator 80 for a next symbol rate and select another individual symbol shaping filter of selectable symbol shaping filters block 50 for the next symbol rate. This process is repeated until demodulator 80 obtains demodulation lock on the received signal. Further details regarding these aspects of the present invention will be provided later herein.

Multiplexer 75 is operative to selectively output either the digital AGC signal generated by loop filter 65, or the digital AGC signal generated by processor 70 responsive to a control signal provided by processor 70, as previously described herein.

Demodulator 80 is operative to perform signal demodulation functions. According to an exemplary embodiment, demodulator 80 processes the amplified digital signal provided from amplifier 55 by performing demodulation functions including symbol timing recovery, carrier recovery, and equalization. Demodulator 80 is preferably capable of demodulating signals of various different symbol rates, including symbol rates of approximately 0.772 MSym/S, 1.024 MSym/S, and 1.544 MSym/S. As previously indicated herein, demodulator 80 performs demodulation functions for a particular symbol rate responsive to a control signal from processor 70 that sets up the symbol timing loop of demodulator 80 for the particular symbol rate. Moreover, demodulator 80 provides a control signal to processor 70 indicating whether demodulation lock is obtained for the particular symbol rate. If demodulator 80 is unable to obtain demodulation lock for the particular symbol rate within a predetermined time period, demodulator 80 adjusts its symbol timing loop for another symbol rate responsive to a control signal from processor 70. Once demodulation lock is obtained, demodulator 80 provides a demodulated output signal for further processing and output.

Figure 2:
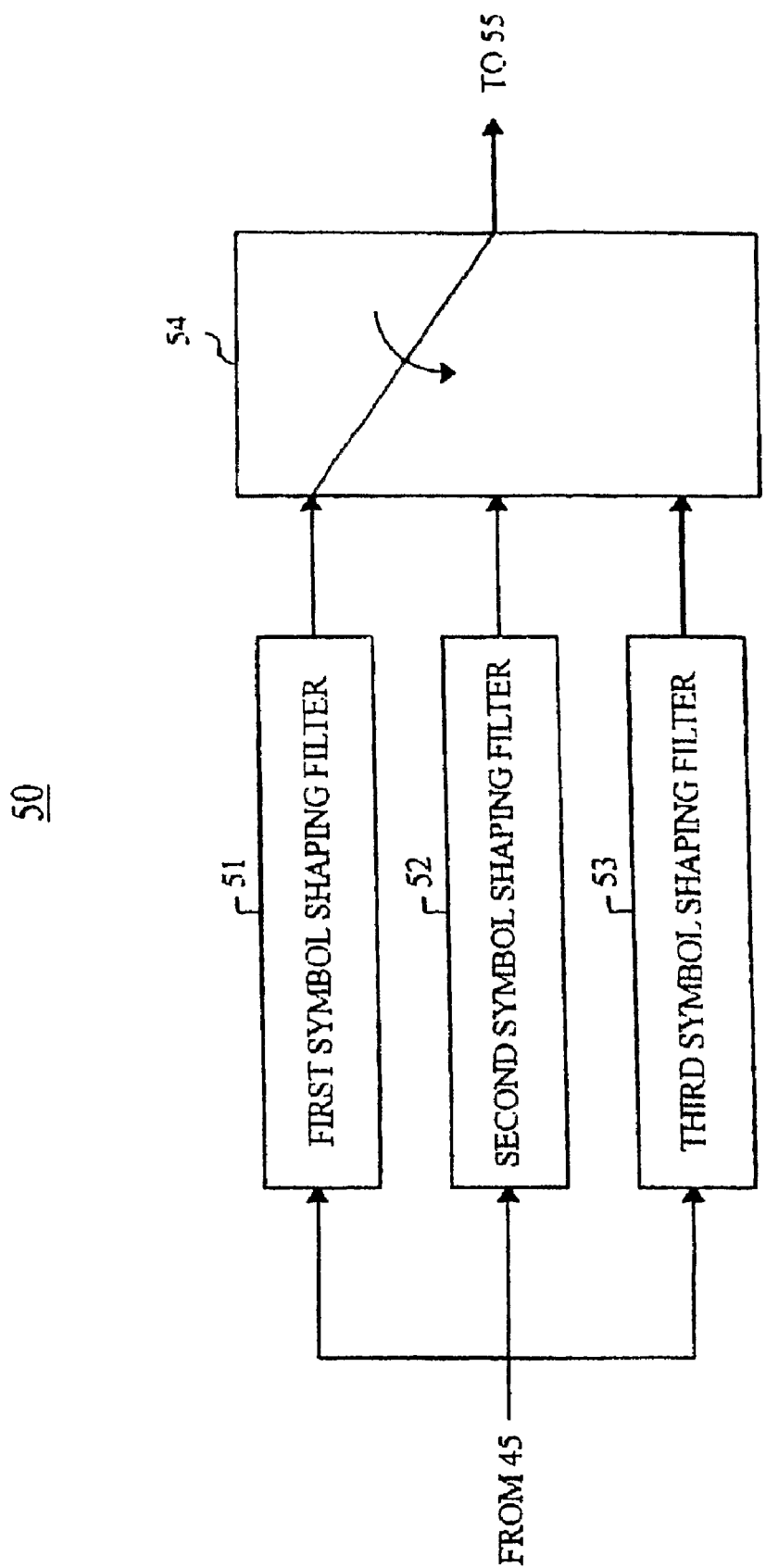
FIG. 2 is a block diagram providing further details of the selectable symbol shaping filter block of FIG. 1 according to an exemplary embodiment of the present invention.

Referring to FIG. 2, a block diagram providing further details of selectable symbol shaping filter block 50 of FIG. 1 according to an exemplary embodiment of the present invention is shown. As shown in FIG. 2, selectable symbol shaping filter block 50 comprises first symbol shaping means such as first symbol shaping filter 51, second symbol shaping means such as second symbol shaping filter 52, third symbol shaping means such as third symbol shaping filter 53, and multiplexing means such as multiplexer 54. The foregoing elements of FIG. 2 may be embodied using ICs, and some elements may for example be included on one or more ICs. For clarity of description, certain conventional elements associated with selectable symbol shaping filter block 50 such as certain control signals, power signals, clock signals and/or other elements may not be shown in FIG. 2.

Figure 3:
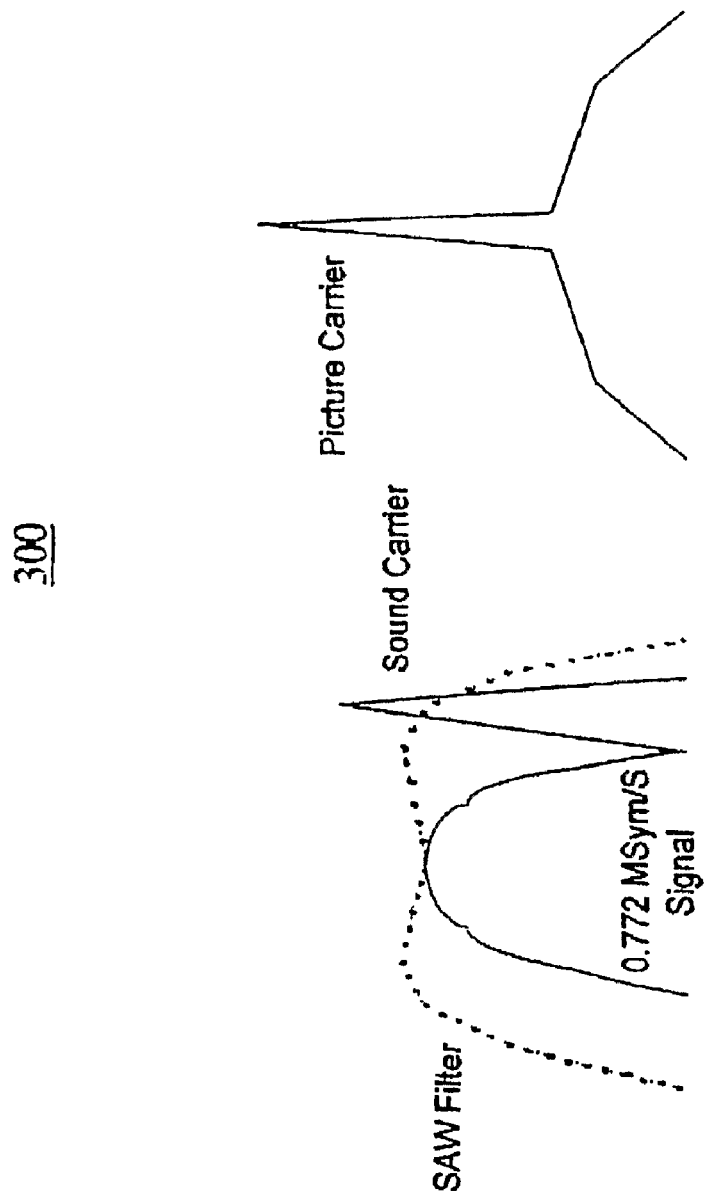
FIG. 3 is a graph illustrating an adjacent channel condition for a signal having a first symbol rate according to an exemplary embodiment of the present invention.

First symbol shaping filter 51 is operative to perform a first symbol shaping function to thereby generate a first filtered digital signal. According to an exemplary embodiment, first symbol shaping filter 51 is designed to accommodate a first symbol rate, such as 0.772 MSym/S. FIG. 3 is a graph 300 illustrating an adjacent channel condition for a 0.772 MSym/S signal according to an exemplary embodiment of the present invention. In FIG. 3, it is assumed that the 0.772 MSym/S signal represents a desired channel to be received in the presence of an undesired adjacent channel having a picture carrier and a sound carrier. As indicated in FIG. 3, SAW filter 20 of FIG. 1 passes the desired 0.772 MSym/S signal, as well as a portion of the sound carrier of the undesired adjacent channel. According to an exemplary embodiment, first symbol shaping filter 51 provides a pass band that corresponds substantially to the desired 0.772 MSym/S signal as shown in FIG. 3. In this manner, first symbol shaping filter 51 is able to separate the 0.772 MSym/S desired channel from the undesired adjacent channel.

Figure 4:
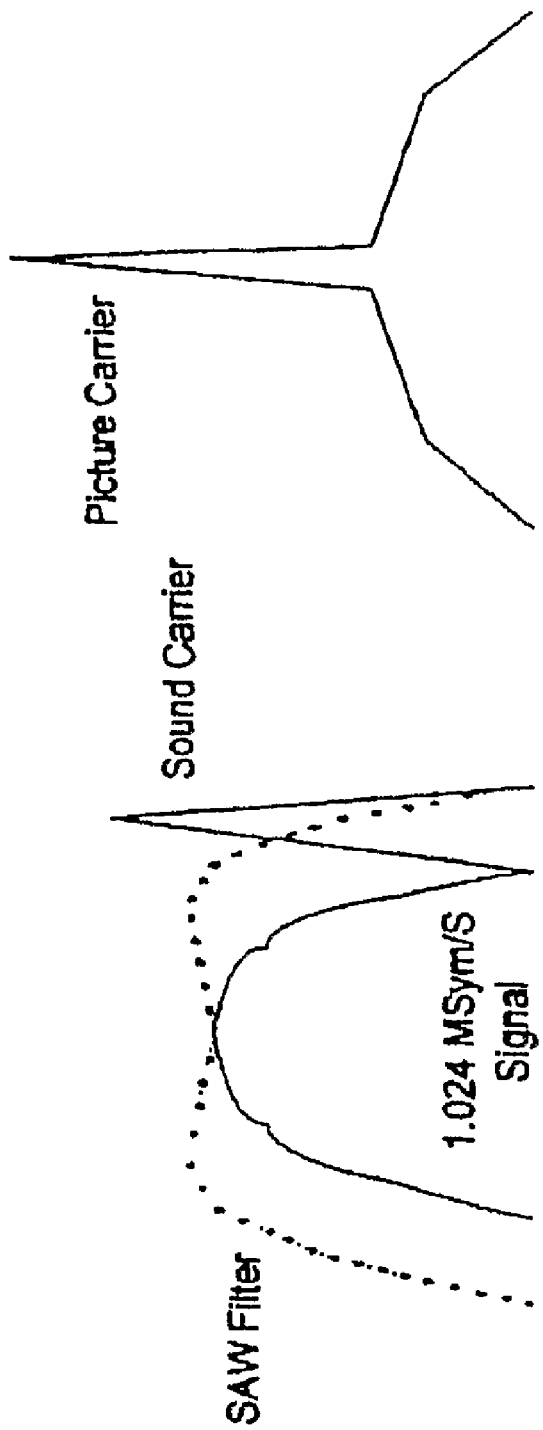
FIG. 4 is a graph illustrating an adjacent channel condition for a signal having a second symbol rate according to an exemplary embodiment of the present invention.

Second symbol shaping filter 52 is operative to perform a second symbol shaping function to thereby generate a second filtered digital signal. According to an exemplary embodiment, second symbol shaping filter 52 is designed to accommodate a second symbol rate, such as 1.024 MSym/S. FIG. 4 is a graph 400 illustrating an adjacent channel condition for a 1.024 MSym/S signal according to an exemplary embodiment of the present invention. In FIG. 4, it is assumed that the 1.024 MSym/S signal represents a desired channel to be received in the presence of an undesired adjacent channel having a picture carrier and a sound carrier. As indicated in FIG. 4, SAW filter 20 of FIG. 1 passes the desired 1.024 MSym/S signal, as well as a portion of the sound carrier of the undesired adjacent channel. According to an exemplary embodiment, second symbol shaping filter 52 provides a pass band that corresponds substantially to the desired 1.024 MSym/S signal as shown in FIG. 4. In this manner, second symbol shaping filter 52 is able to separate the 1.024 MSym/S desired channel from the undesired adjacent channel.

Figure 5:
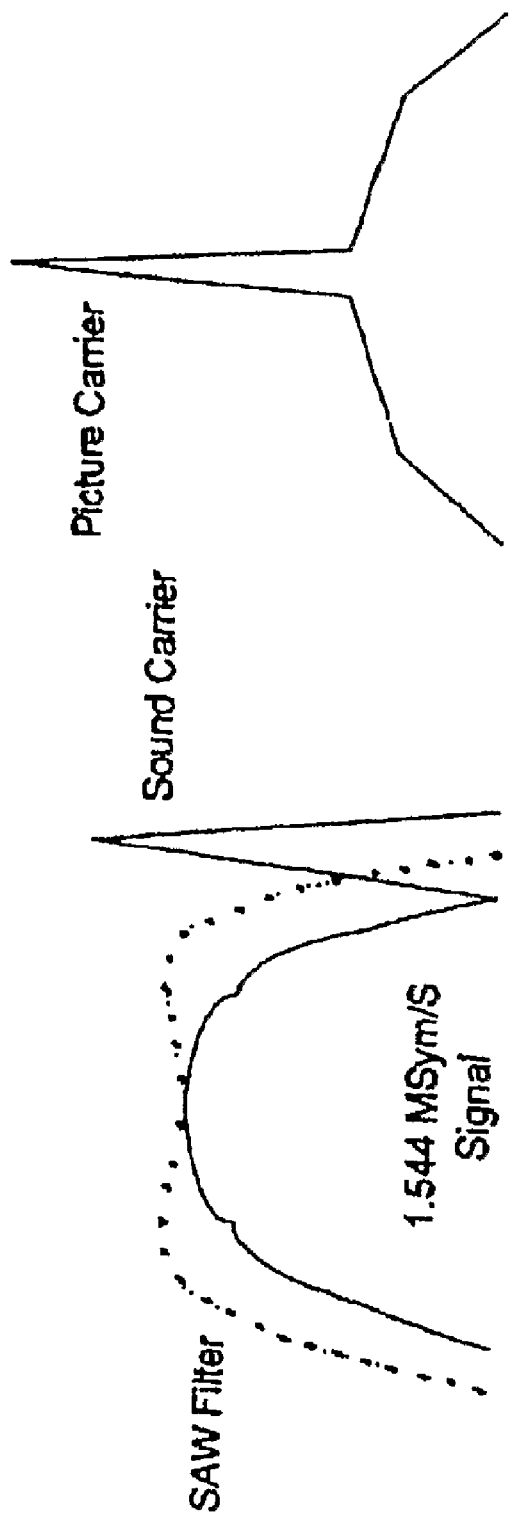
FIG. 5 is a graph illustrating an adjacent channel condition for a signal having a third symbol rate according to an exemplary embodiment of the present invention.

Third symbol shaping filter 53 is operative to perform a third symbol shaping function to thereby generate a third filtered digital signal. According to an exemplary embodiment, third symbol shaping filter 53 is designed to accommodate a third symbol rate, such as 1.544 MSym/S. FIG. 5 is a graph 500 illustrating an adjacent channel condition for a 1.544 MSym/S signal according to an exemplary embodiment of the present invention. In FIG. 5, it is assumed that the 1.544 MSym/S signal represents a desired channel to be received in the presence of an undesired adjacent channel having a picture carrier and a sound carrier. As indicated in FIG. 5, SAW filter 20 of FIG. 1 passes the desired 1.544 MSym/S signal, as well as a portion of the sound carrier of the undesired adjacent channel. According to an exemplary embodiment, third symbol shaping filter 53 provides a pass band that corresponds substantially to the desired 1.544 MSym/S signal as shown in FIG. 5. In this manner, third symbol shaping filter 53 is able to separate the 1.544 MSym/S desired channel from the undesired adjacent channel.

Multiplexer 54 is operative to selectively output one of the filtered digital signals provided from first symbol shaping filter 51, second symbol shaping filter 52 and third symbol shaping filter 53. According to an exemplary embodiment, a control signal from processor 70 causes multiplexer 54 to output either the first filtered digital signal generated by first symbol shaping filter 51, the second filtered digital signal generated by second symbol shaping filter 52, or the third filtered digital signal generated by third symbol shaping filter 53.

Given the high selectivity of first symbol shaping filter 51, second symbol shaping filter 52 and third symbol shaping filter 53 of FIG. 2, it is possible to eliminate SAW filter 20 of FIG. 1 all together, or replace it with a simpler less expensive filter (e.g., double tuned filter, etc.) that passes more adjacent channel energy. To achieve this cost savings, ADC 30 of FIG. 1 may be required to provide additional bits of resolution and/or the number of taps provided for first symbol shaping filter 51, second symbol shaping filter 52 and third symbol shaping filter 53 may be increased to improve undesired band rejection.

Figure 6:
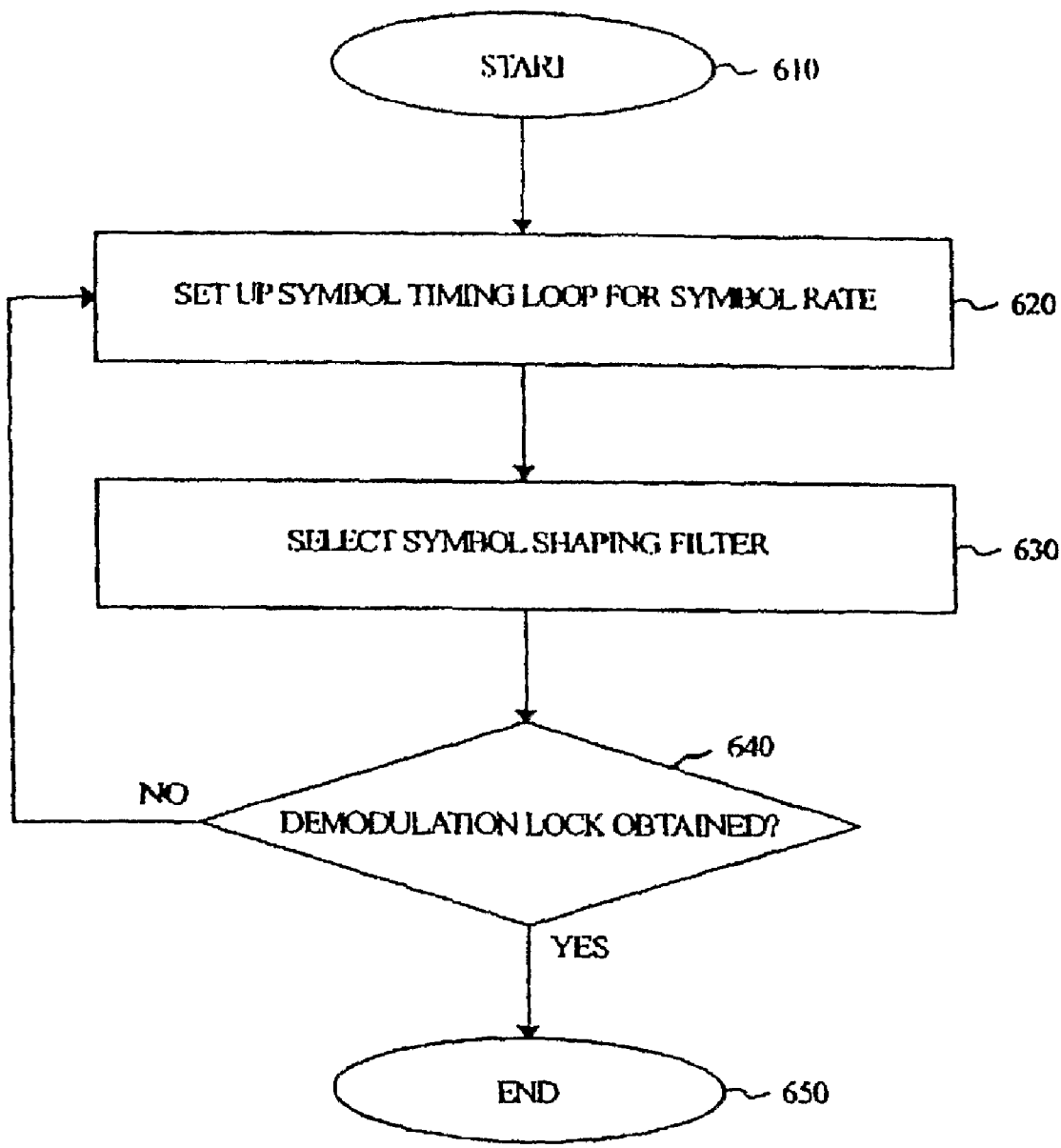
FIG. 6 is a flowchart illustrating steps according to an exemplary embodiment of the present invention.

To facilitate a better understanding of the present invention, an example will now be provided. Referring now to FIG. 6, a flowchart 600 illustrating steps according to an exemplary embodiment of the present invention is shown. For purposes of example and explanation, the steps of FIG. 6 will be described with reference to the elements of apparatus 100 as previously described herein. The steps of FIG. 6 are merely exemplary, and are not intended to limit the present invention in any manner.

At step 610, process flow starts. According to an exemplary embodiment, process flow may start at step 610 responsive to apparatus 100 being turned on by a user. At step 620, the symbol timing loop of demodulator 80 is set up for a particular symbol rate. According to an exemplary embodiment, processor 70 provides a control signal to demodulator 80 that causes the symbol timing loop of demodulator 80 to be set up for the particular symbol rate. For example, after apparatus 100 is initially turned on, processor 70 may cause the symbol timing loop of demodulator 80 to be set up for the 1.544 MSym/S symbol rate.

At step 630, one of the symbol shaping filters of selectable symbol shaping filters block 50 is selected. According to an exemplary embodiment, processor 70 provides a control signal to selectable symbol shaping filters block 50 to thereby select the individual symbol shaping filter (i.e., first symbol shaping filter 51, second symbol shaping filter 52 or third symbol shaping filter 53 of FIG. 2) that corresponds to the particular symbol rate for which the symbol timing loop of demodulator 80 is set up for at step 620. In particular, the control signal provided from processor 70 at step 630 causes multiplexer 54 of selectable symbol shaping filters block 50 to output the filtered digital signal generated by the selected symbol shaping filter.

At step 640, a determination is made by processor 70 as to whether demodulation lock is obtained within a predetermined time period. According to an exemplary embodiment, demodulator 80 provides a control signal to processor 70 to indicate whether demodulation lock is obtained at step 640.

If the determination at step 640 is positive, process flow advances to step 650 where the process ends and demodulator 80 is able to provide a properly demodulated signal for further processing and output. Alternatively, if the determination at step 640 is negative, process flow loops back to step 620 where the symbol timing loop of demodulator 80 is set up for another symbol rate. In this manner, steps 620 to 640 may be repeatedly performed until a demodulation lock is obtained. The order in which symbol rates are attempted for demodulation lock in the steps of FIG. 6 may be selected as a matter of design choice. For example, the symbol rates may be ordered from highest to lowest, vice-versa, or in any prescribed order.

It is further noted that the present invention may be implemented such that an individual one of symbol shaping filters 51, 52 and 53 of selectable symbol shaping block 50 is selected by an application circuit designer. In this manner, apparatus 100 would be designed to accommodate signals of one given symbol rate, but would have the programmable capability to accommodate signals of multiple symbol rates.

As described herein, the present invention provides an apparatus and method for performing signal processing that is capable of removing adjacent channel energy for extremely different desired channel bandwidths and varying adjacent channel conditions. The present invention may be applicable to various apparatuses, either with or without an integrated display device. Accordingly, the phrase "television signal receiver" as used herein may refer to systems or apparatuses including, but not limited to, television sets, computers or monitors that include an integrated display device, and systems or apparatuses such as set-top boxes, video cassette recorders (VCRs), digital versatile disk (DVD) players, video game boxes, personal video recorders (PVRs), computers or other apparatuses that may not include an integrated display device.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An apparatus, comprising:
a digital signal source for providing a digital signal having a symbol rate;
a plurality of symbol shaping means;
amplifying means for amplifying said filtered digital signal to generate an amplified digital signal;
demodulating means for processing said amplified digital signal to obtain a demodulation lock; and
processing means for detecting if said demodulating means obtains said demodulation lock and causing said selected symbol shaping means to be selected responsive to said detection;
wherein a selected one of said symbol shaping means is used to filter said digital signal and generate a filtered digital signal based on said symbol rate.

2. The apparatus of claim 1, wherein:
a first one of said symbol shaping means is used to filter said digital signal if said symbol rate is a first symbol rate;
a second one of said symbol shaping means is used to filter said digital signal if said symbol rate is a second symbol rate; and
a third one of said symbol shaping means is used to filter said digital signal if said symbol rate is a third symbol rate.

3. The apparatus of claim 2, wherein:
said first symbol rate is approximately 0.772 MSym/S;
said second symbol rate is approximately 1.024 MSym/S; and
said third symbol rate is approximately 1.544 MSym/S.

4. The apparatus of claim 1, further comprising:
digital AGC means for generating a digital AGC signal responsive to said amplified digital signal;
wherein said digital AGC signal is provided to said amplifying means.

5. The apparatus of claim 1, further comprising:
analog filtering means for filtering an analog signal to generate a filtered analog signal including a desired channel corresponding to said digital signal and a portion of an undesired adjacent channel; and
wherein said selected symbol shaping means separates said desired channel from said undesired adjacent channel.

6. A method for performing signal processing, comprising:
receiving a digital signal having a symbol rate;
providing a plurality of symbol shaping filters;
amplifying said filtered digital signal to generate an amplified digital signal;
processing said amplified digital signal to obtain a demodulation lock;
detecting if said demodulation lock is obtained;
selecting said selected symbol shaping filter responsive to said detection; and using a selected one of said symbol shaping filters to filter said digital signal and generate a filtered digital signal based on said symbol rate.

7. The method of claim 6, further comprising:
using a first one of said symbol shaping filters to filter said digital signal if said symbol rate is a first symbol rate;
using a second one of said symbol shaping filters to filter said digital signal if said symbol rate is a second symbol rate; and
using a third one of said symbol shaping filters to filter said digital signal if said symbol rate is a third symbol rate.

8. The method of claim 7, wherein:
said first symbol rate is approximately 0.772 MSym/S;
said second symbol rate is approximately 1.024 MSym/S; and
said third symbol rate is approximately 1.544 MSym/S.

9. The method of claim 6, further comprising:
generating a digital AGC signal responsive to said amplified digital signal.

10. The method of claim 6, further comprising:
filtering an analog signal to generate a filtered analog signal including a desired channel corresponding to said digital signal and a portion of an undesired adjacent channel; and
wherein said selected symbol shaping filter is used to separate said desired channel from said undesired adjacent channel.

11. A television signal receiver, comprising:
a digital signal source for providing a digital signal having a symbol rate;
a plurality of symbol shaping filters;
an amplifier operative to amplify said filtered digital signal to generate an amplified digital signal;
a demodulator operative to process said amplified digital signal to obtain a demodulation lock; and
a processor operative to detect if said demodulator obtains said demodulation lock and cause said selected symbol shaping filter to be selected responsive to said detection;
wherein a selected one of said symbol shaping filters is used to filter said digital signal and generate a filtered digital signal based on said symbol rate.

12. The television signal receiver of claim 11, wherein:
a first one of said symbol shaping filters is used to filter said digital signal if said symbol rate is a first symbol rate;
a second one of said symbol shaping filters is used to filter said digital signal if said symbol rate is a second symbol rate; and
a third one of said symbol shaping filters is used to filter said digital signal if said symbol rate is a third symbol rate.

13. The television signal receiver of claim 12, wherein:
said first symbol rate is approximately 0.772 MSym/S;
said second symbol rate is approximately 1.024 MSym/S; and
said third symbol rate is approximately 1.544 MSym/S.

14. The television signal receiver of claim 11, further comprising:
a digital AGC operative to generate a digital AGC signal responsive to said amplified digital signal; and
wherein said digital AGC signal is provided to said amplifier.

15. The television signal receiver of claim 11, further comprising:
an analog filter operative to filter an analog signal and generate a filtered analog signal including a desired channel corresponding to said digital signal and a portion of an undesired adjacent channel; and
wherein said selected symbol shaping filter is operative to separate said desired channel from said undesired adjacent channel.

* * * * *